(12) United States Patent
Xu et al.

(10) Patent No.: US 11,981,870 B2
(45) Date of Patent: May 14, 2024

(54) RENEWABLE DIESEL PRODUCTION WITH HEAT RELEASE MANAGEMENT

(71) Applicant: ExxonMobil Technology and Engineering Company, Annandale, NJ (US)

(72) Inventors: Xiaochun Xu, Basking Ridge, NJ (US); Shifang Luo, Annandale, NJ (US); Samuel J. Cady, Morristown, NJ (US); Michael H. Ring, Conroe, TX (US)

(73) Assignee: ExxonMobile Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/453,184

(22) Filed: Nov. 2, 2021

(65) Prior Publication Data

US 2022/0145189 A1    May 12, 2022

Related U.S. Application Data (60) Provisional application No. 63/112,939, filed on Nov. 12, 2020.

(51) Int. Cl.
*C10G 3/00* (2006.01)
*C10G 45/64* (2006.01)

(52) U.S. Cl.
CPC .............. *C10G 3/54* (2013.01); *C10G 3/44* (2013.01); *C10G 3/50* (2013.01); *C10G 45/64* (2013.01); *C10G 2300/1014* (2013.01); *C10G 2300/4006* (2013.01); *C10G 2300/4081* (2013.01); *C10G 2300/70* (2013.01); *C10G 2400/04* (2013.01)

(58) Field of Classification Search
CPC ... C10G 3/44; C10G 3/50; C10G 3/54; C10G 45/64; C10G 2300/1011; C10G 2300/1014; C10G 2300/4006; C10G 2300/4081; C10G 2300/70; C10G 2400/04; C10G 2400/06; C10G 65/02; C10G 69/02; Y02P 30/20; Y02E 50/10
See application file for complete search history.

(56) References Cited

U.S. PATENT DOCUMENTS

| | | | |
|---|---|---|---|
| 8,431,756 | B2 | 4/2013 | Roberts et al. |
| 8,674,160 | B2 | 3/2014 | Hanks et al. |
| 8,729,330 | B2 | 5/2014 | Hanks et al. |
| 9,464,238 | B2 | 10/2016 | Hanks et al. |
| 9,617,479 | B2 | 4/2017 | Fingland et al. |
| 10,000,712 | B2 | 6/2018 | Novak et al. |
| 2011/0056869 | A1 | 3/2011 | Novak et al. |
| 2011/0072715 | A1 | 3/2011 | Hanks et al. |
| 2012/0017496 | A1 | 1/2012 | Yao et al. |
| 2017/0037322 | A1 | 2/2017 | Dutta et al. |

OTHER PUBLICATIONS

International Search Report and Written Opinion of PCT/US2021/072171 dated Nov. 2, 2021.

*Primary Examiner* — In Suk C Bullock
*Assistant Examiner* — Jason Y Chong
(74) *Attorney, Agent, or Firm* — Shook, Hardy & Bacon L.L.P.

(57) ABSTRACT

Systems and methods are provided for processing a bio-derived feedstock in a commercial scale reactor to form renewable distillate boiling range fractions while managing the heat release. The management of the heat release is achieved in part by introducing 1.0 vol % or more of CO into at least a portion of the reaction environment for hydroprocessing of the bio-derived feedstock. The 1.0 vol % or more of CO can selectively reduce the activity of hydrotreating catalyst for olefin saturation.

20 Claims, 2 Drawing Sheets

RENEWABLE DIESEL PRODUCTION WITH HEAT RELEASE MANAGEMENT

CROSS-REFERENCE TO RELATED APPLICATIONS

This application is related to and claims the benefit of priority from U.S. Provisional Application No. 63/112,939 filed Nov. 12, 2020, which is hereby incorporated by reference in its entirety.

FIELD OF THE INVENTION

This invention relates to processing of renewable feeds to form renewable distillate boiling range products, such as renewable diesel.

BACKGROUND OF THE INVENTION

One of the pathways to forming renewable fuels is to form renewable diesel fuels from triglyceride feeds or other types of biomass-derived feeds that include fatty acids or fatty acid derivatives, such as fatty acid alkyl esters or triglycerides. Many types of fatty acids can have a carbon chain lengths between $C_{10}$ and $C_{22}$, so that such fatty acids/fatty acid derivatives are a useful starting point for formation of diesel fuel or other distillate boiling range fuels.

Feeds containing fatty acids or fatty acid derivatives also typically contain a substantial amount of oxygen. For example, a triglyceride typically includes a total of six oxygen atoms, corresponding to an ester linkage between the propyl backbone and the long carbon chain of the fatty acid. Additionally, the carbon chains in a fatty acid typically include one or more olefinic carbon-carbon bonds per carbon chain. It is typically desirable to remove the oxygen and olefins from a distillate boiling range fraction prior to using such a fraction as a fuel.

Unfortunately, in a commercial scale reactor, attempting to remove the oxygens and olefins from a feed containing fatty acids or fatty acid derivatives can result in a large, localized heat release. In a conventional hydrotreating reactor, this heat release can result in localized temperature increases on the order of several hundred degrees Celsius. This type of localized heat release is undesirable in a reactor, as it can lead to a variety of problems for catalyst beds in the reactor and/or the structural integrity of the reactor itself. As a result, conventional methods for performing deoxygenation and olefin saturation on feeds containing fatty acid derivatives typically include a substantial amount of product recycle. The recycle dilutes the fresh feed with product that is already deoxygenated and saturated. This reduces the density of oxygen and olefins in the feed, resulting in a smaller heat release per unit time in a given localized volume. However, the substantial amount of recycle that is required means that the size of the reactor and/or various support components (e.g., pumps, separators) needed to perform the deoxygenation is substantially increased. It would be desirable to have methods for processing glyceride-containing feeds (and/or other feeds containing fatty acids and/or fatty acid derivatives) to remove oxygen and olefins while reducing or minimizing the amount of product recycle that is needed.

U.S. Pat. No. 9,617,479 describes methods for hydroprocessing of triglycerides to form renewable diesel and propylene. The methods include exposing a triglyceride-containing feed to a catalyst containing a Group 6 metal and a non-noble Group 8-10 metal in the presence of 300 vppm to 7000 vppm (0.03 vol % to 0.7 vol %) of CO. The process is described as allowing a portion of the $C_3$ backbone carbon chains from the triglycerides to form propylene rather than propane in the final product slate. An example based on pilot scale data at 0.2 vol % CO is also described.

U.S. Pat. No. 9,464,238 describes methods for hydroprocessing of triglycerides to form renewable diesel. The methods include exposing a triglyceride-containing feed to a catalyst containing either a Group 6 metal or a non-noble Group 8-10 metal.

SUMMARY OF THE INVENTION

In various aspects, a method is provided for processing a feed comprising fatty acids, fatty acid derivatives, or a combination thereof. The method includes exposing a feed comprising 4.0 wt % or more of oxygen and 20 wt % or more of fatty acids, fatty acid derivatives, or a combination thereof to one or more catalyst beds including hydrotreating catalyst in a reactor having a reactor diameter of 1.0 m or more under hydrotreating conditions to form a hydrotreated effluent comprising 1.0 wt % or less of oxygen. The exposing of the feed to a first upstream catalyst bed of the one or more catalyst beds under hydrotreating conditions can further include exposing the feed to the first upstream catalyst bed in the presence of 1.0 vol % or more of CO. Optionally, the first upstream catalyst bed can have a catalyst bed depth of 1.0 m or more.

DETAILED DESCRIPTION OF THE INVENTION

All numerical values within the detailed description and the claims herein are modified by "about" or "approximately" the indicated value, and take into account experimental error and variations that would be expected by a person having ordinary skill in the art.

In various aspects, systems and methods are provided for processing a bio-derived feedstock in a commercial scale reactor to form renewable distillate boiling range fractions while managing the heat release. The management of the heat release is achieved in part by introducing 1.0 vol % or more of CO (or 1.4 vol % or more) into at least a portion of the reaction environment for hydroprocessing of the bio-derived feedstock. The 1.0 vol % or more of CO can be introduced into the portion of the reaction environment including the first upstream bed of hydroprocessing catalyst (i.e., the first bed of hydrotreating catalyst that is contacted by the feed); or the CO can be introduced into a portion of the reaction environment including a plurality of catalyst beds; or the CO can be introduced into a portion of the reaction environment corresponding to substantially all of the catalyst beds that include hydrotreating catalyst.

The introduction of 1.0 vol % or more CO (or 1.4 vol % or more) can selectively suppress catalyst activity for olefin saturation relative to the catalyst activity for deoxygenation. As a result, the volume of catalyst where olefin saturation occurs can be expanded, and therefore the average heat release per unit volume can be reduced. In contrast to conventional methods of mitigating heat release, this reduction in the average heat release per unit volume can be achieved while maintaining or possibly even reducing the volume of catalyst needed to perform substantially complete deoxygenation and/or olefin saturation of a feed. Optionally, additional management of the heat release can be achieved by having an initial upstream catalyst bed in a hydroprocessing reactor that corresponds to a low activity hydroprocessing catalyst, such as a catalyst corresponding to a non-noble metal from Group 6 (e.g., Mo) on an oxide support. Using a lower activity catalyst can further expand the volume where both deoxygenation and olefin saturation occur.

It is noted that using a lower activity catalyst can, by itself, reduce the amount of recycle that is needed. However, simply using a lower activity catalyst corresponds to a non-selective reduction in activity, so that both olefin saturation and deoxygenation activity are reduced. This means that additional catalyst volume will be needed in the reactor to achieve complete deoxygenation and/or olefin saturation. By contrast, by selectively reducing catalyst activity for olefin saturation (a faster reaction than deoxygenation), the volume where heat release occurs can be expanded while having a reduced or minimized impact on total catalyst volume. In fact, based on the reduced need for recycle, selectively reducing catalyst activity for olefin saturation can potentially allow for a decrease in total catalyst volume in the reactor.

Commercial scale hydroprocessing is a commonly used technique in refineries for modifying the composition and/or properties of various types of mineral feeds. Two examples of hydroprocessing are hydrotreatment and catalytic dewaxing. During hydrotreatment, a feed is exposed to a suitable catalyst at temperatures of 200° C. or more and in the presence of a substantial partial pressure of hydrogen. Catalytic dewaxing can also involve elevated temperatures and substantial partial pressure of hydrogen, but dewaxing can differ from hydrotreatment in terms of both the type of catalyst and the specific types of reaction conditions. An example of a suitable process for production of distillate fuels, such as renewable distillate fuel (including renewable diesel) is a process involving a first hydrotreatment stage followed by a second stage for performing catalytic dewaxing.

Because of the elevated pressures and temperatures that are involved, as well as the large volumes of feed for processing, hydroprocessing is typically performed in commercial sale reactor. Fixed bed or trickle bed commercial scale reactors have several common features, including reactor diameters of 1.0 meters or more, and minimum catalyst bed volumes of roughly 25 m$^3$ or more (~1000 ft$^3$ or more). Due to the large reactor size, commercial scale reactors are typically operated under adiabatic conditions. This is in contrast to pilot scale (or smaller) reactors, where the reactor diameter is less than 0.05 meters. Due to the substantially lower ratio of volume to surface area in a pilot scale reactor, such smaller scale reactors are typically operated under isothermal conditions. The minimum catalyst bed volumes for commercial scale reactors are dictated in part by practical factors related to fluid flow within a commercial scale reactor that are of low concern in a pilot scale (or smaller) reactor. For example, in order to generate a desirable flow pattern within a catalyst bed, a catalyst bed should have enough height so that the feed within the reactor is distributed relatively evenly across the full diameter of the bed. This is in contrast to "channeling" of a feed, where the feed passes through a relatively small portion of the volume of the catalyst. Additionally, having sufficient catalyst bed height can reduce or minimize difficulties with potential flooding and/or fluidization of the catalyst bed. In order to fill a commercial scale diameter catalyst bed with a sufficient height of catalyst for commercial scale operation, the resulting catalyst volumes per catalyst bed correspond to 25 m$^3$ or more of catalyst, or 50 m$^3$ or more, or 100 m$^3$ or more, such as up to 500 m$^3$ or possibly still higher. In a reactor having a diameter of 1.0 m to 10 m, this can correspond to a catalyst bed height of 1.0 m to 15 m.

Because of the diameter and minimum catalyst bed volumes required in a commercial scale reactor, thermal management in a commercial scale reactor is also different from a pilot scale (or smaller) reactor. In a pilot scale reactor, the surface area of the reactor relative to the interior volume can be large. Additionally, the distance from the center of the reactor to the exterior is by definition 0.025 meters or less. Due to the small diameter and high surface to volume ratio, a variety of options are available for managing heat release in a pilot scale reactor. For example, a common heat management technique for pilot scale reactors is to use a heat transfer medium and/or heat tracing around at least a portion of the reactor so that the reactor can operate under isothermal conditions. By contrast, in a commercial scale reactor, the ratio of surface area to volume drops rapidly with increasing diameter. Additionally, due to the increased diameter, transport of heat from the center of the reactor to the edges can become increasingly difficult. This means that isothermal operation is typically not feasible, and instead the reactor is operated adiabatically. As a result, one of the concerns with operation of a commercial scale reactor is management of reactions within a catalyst bed to reduce or minimize thermal hot spots. In particular, heat release within a catalyst bed needs to be managed to avoid a feedback loop for exothermic reactions, where excessive heat generation raises the temperature in a catalyst bed, causing an increased reaction rate, and therefore causes still faster heat release in an uncontrolled manner.

Although certain minimum sizes are required in commercial scale processing, it is still desirable to also reduce or minimize the amount of catalyst used in a hydroprocessing reaction. Reducing the amount of catalyst needed for a reaction not only allows for smaller reactor sizes, but also reduces the costs for the catalyst itself. Thus, design of commercial hydroprocessing reactors represents a balance between a variety of competing factors.

Exposing a feed to hydrotreating conditions can result in several types of reactions, including removal of heteroatoms (different from carbon and hydrogen) such as carbon, nitrogen or oxygen; and saturation of olefins and/or aromatics. For conventional mineral feeds, the typical reactions in a hydrotreatment stage correspond to olefin saturation, aromatic saturation, nitrogen removal, and sulfur removal. In the reactor, the olefin saturation for a feed can occur relatively rapidly. The aromatic saturation, nitrogen removal, and sulfur removal can occur over longer periods of time. In a commercial scale reactor, this difference in the time scales of the reactions can be beneficial from a thermal management standpoint. In particular, due to the rapid reaction rate for olefin saturation, substantially all of the olefin saturation will occur in the initial catalyst bed, and possibly in a small portion of the initial catalyst bed. However, commercial distillate feeds typically have a relatively low number of olefins. As a result, the heat release from the olefin saturation in the initial catalyst bed typically results in an acceptable temperature rise across the first catalyst bed of 100° C. or less, or 60° C. or less, or 40° C. or less, such as down to substantially no temperature rise. (Some desulfurization and denitrogenation can still occur in the initial bed, but at slower time scales, so initially olefin saturation is the dominant reaction.) This level of heat release can be managed using conventional methods, such as having an inter-bed quench after the first catalyst bed.

Hydrotreatment of feeds including fatty acids and/or fatty acid derivatives can present a different type of challenge relative to hydrotreatment of mineral feeds. First, feeds including a substantial portion of fatty acids and/or fatty acid derivatives (such as glycerides) can include substantial amounts olefins. For example, a typical triglyceride molecule can include an average of roughly 4.5 olefinic bonds. Due to this high concentration of olefinic bonds, performing olefin saturation on a feed containing fatty acids and/or fatty acid derivatives can have a much larger heat release. If this heat release occurs in a single catalyst bed and/or a limited portion of a catalyst bed, the temperature increase can be 60° C. or more, or 100° C. or more, or 150° C. or more, which is larger than desirable based on safety considerations.

An additional factor can be the oxygen content of a feed. Feeds derived from biological sources can generally include a substantial quantity of oxygen, such as from 4.0 wt % to 15 wt %. This is in contrast to typical mineral feeds, which often have substantially no oxygen content. Based on this substantial oxygen content, deoxygenation of a feed including fatty acids and/or fatty acid derivatives can also evolve a large amount of heat. The reaction rate for deoxygenation is typically slower than the reaction rate for olefin saturation, but the relative rates are close enough that there is significant overlap, which can further exacerbate the temperature rise in an initial catalyst bed.

For a feed derived from a biological source, the combination of a high olefin content and a high oxygen content can present difficult choices in designing a suitable hydrotreatment stage. For most types of distillate fuels, the desired end product from hydrotreatment of a feed is to have substantially complete olefin saturation and substantially complete deoxygenation. Thus, it is desirable to achieve substantially complete deoxygenation while reducing or minimizing the catalyst volume needed for the deoxygenation. This can reduce reactor size and/or allow later catalyst beds in a reactor to be focused on other hydrotreatment objectives, such as reducing the nitrogen content of the feed to a desired level. However, it is also desirable to be able to use a commercial scale reactor and to avoid an excessive temperature rise in the initial catalyst bed.

Figure 2:
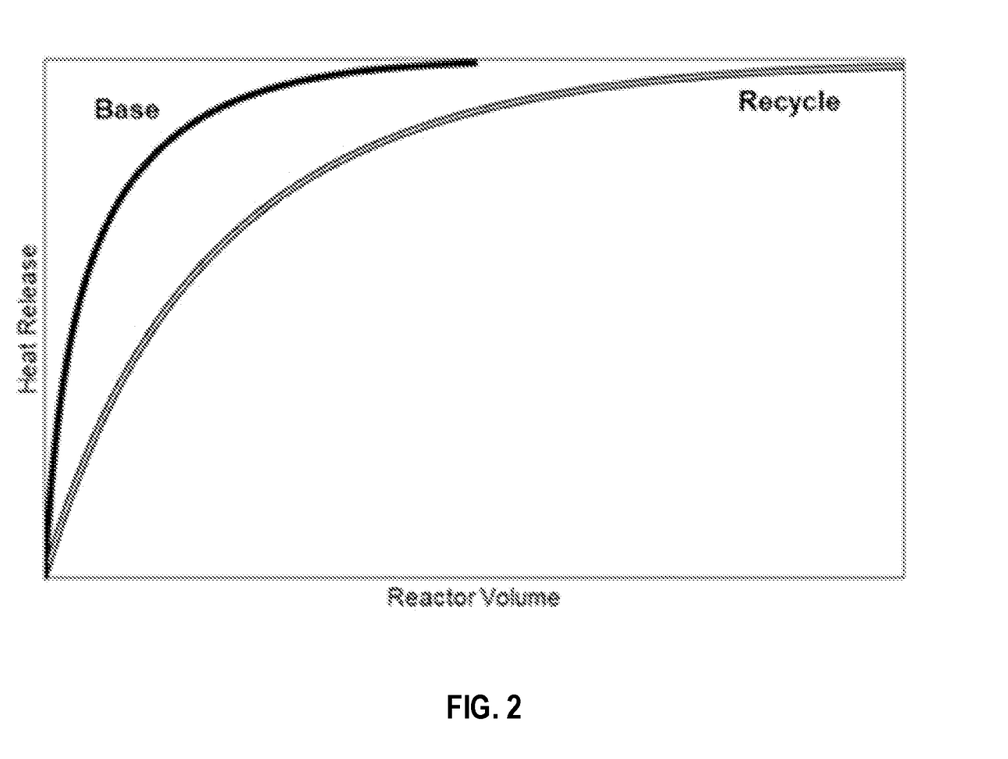
FIG. 2 shows an example of the relationship between heat release and reactor size during processes for production of renewable distillate fuel.

Conventionally, the solution to handling feeds derived from biological sources has been to use a substantial amount of product recycle. By using recycled product that is already saturated and deoxygenated, the feed can be sufficiently diluted so that the temperature rise across the initial catalyst bed is at a desired level, such as 100° C. or less, or 60° C. or less, or 40° C. or less such as down to having substantially no temperature rise across the catalyst bed. However, dilution slows down both the rate of olefin saturation and the rate of deoxygenation. As a result, in order to accommodate the dilution of the feed, a larger reactor and/or a larger volume of catalyst needs to be used for deoxygenation. FIG. 2 shows an example of the trade-off that is involved in using product recycle for thermal management. FIG. 2 qualitatively shows heat release versus reactor volume for hydrotreatment of a hypothetical glyceride-containing feed. The left curve shows the heat release versus reactor volume when recycle is not used. The right curve shows the heat release versus reactor volume when product recycle is used with equal volumes of fresh feed and product recycle.

In various aspects, it has been unexpectedly discovered that the thermal management problems related to hydrotreatment of feeds derived from biological sources can be addressed in part by selectively reducing the olefin saturation activity of the hydrotreating catalyst in the initial hydrotreating catalyst bed. By adding 1.0 vol % or more (or 1.4 vol % or more) of CO to the hydrotreating reaction environment, it has been discovered that the activity of a hydrotreating catalyst for olefin saturation can be selectively lowered relative to the activity of the catalyst for deoxygenation. In some aspects, this selective deactivation can be sufficient so that the rate constant for olefin saturation actually falls below the rate constant for deoxygenation. By selectively suppressing the olefin saturation activity, the volume within a catalyst bed where olefin saturation occurs can be greatly expanded while substantially maintaining catalyst activity for deoxygenation. Since this can allow a reduction in the amount of recycle, the amount of catalyst that is needed for substantially complete deoxygenation can actually be reduced, even though the addition of CO may cause some reduction in deoxygenation activity. By adding 1.0 vol % or more (or 1.4 vol % or more) of CO to the reaction environment to reduce the rate of olefin saturation while still substantially maintaining deoxygenation activity, the amount of recycle that is needed for heat management can be reduced by 10 vol % or more relative to the amount of fresh feed, or 20 vol % or more, or 30 vol % or more, such as up to reducing the recycle amount by 200 vol % or more relative to the amount of fresh feed. In such aspects, the recycle fraction can correspond to 45 wt % or less of the total feed to the reactor, or 40 wt % or less, or 30 wt % or less, or 20 wt % or less, such as down to 1.0 wt %. Alternatively, the recycle can be substantially eliminated.

Due to the slower reaction rate for deoxygenation, the first catalyst bed can have a sufficient catalyst volume for only partial deoxygenation of a feed containing fatty acids and/or fatty acid derivatives. Addition of CO can allow for reduction in recycle rate while also substantially preserving the deoxygenation rate in the initial catalyst bed. As a result, the heat release in the initial catalyst bed (or initial portion of the initial catalyst bed) can be reduced while also reducing the overall catalyst volume that is needed for deoxygenation.

After exposing the feed to a plurality of catalyst beds containing a hydrotreating catalyst, the oxygen content of the hydrotreated effluent can be reduced to 1.0 wt % or less, or 0.5 wt % or less, such as down to having substantially no oxygen content. Additionally or alternately, the olefin content of the hydrotreated effluent can be reduced to 1.0 wt % or less, or 0.5 wt % or less, such as down to having substantially no olefin content. It is noted that the "hydrotreated effluent" that contains 1.0 wt % or less of oxygen and/or 1.0 wt % or less of olefins may correspond to an intermediate hydrotreated effluent. In such aspects, after substantially removing the oxygen and olefins, the resulting hydrotreated effluent can optionally be exposed to additional hydrotreating catalyst under hydrotreating conditions. This can be performed, for example, to further reduce the nitrogen and/or sulfur content of the feed.

In this discussion, the sulfur content of a fraction can be determined according to ASTM D2622. The nitrogen content of a fraction can be determined according to ASTM D4629. The olefin content of a fraction can be determined by NMR. The oxygen content of a fraction can be determined by reductive pyrolysis.

Definitions

In this discussion, fresh feed to a reactor is defined as feed that has not previously passed through the reactor. Product recycle is defined as the volume of any $C_{5+}$ hydrocarbons that are returned to a reactor after passing through the reactor. Thus, any hydrogen recycled to the reactor is not considered as part of the product recycle.

In this discussion, the amount of product recycle to a hydroprocessing stage can be defined relative to the amount of fresh feed to the hydroprocessing stage. Under this definition, a recycle amount of 100 vol % corresponds to having an amount of product recycle that is equal to the volume of fresh feed. It is noted that amounts of product recycle larger than 100 vol % are possible. For example, if the volume of product recycle is twice the volume of the fresh feed, the amount of product recycle would correspond to 200 vol % of the amount of fresh feed to a reactor.

A distillate boiling range fraction is defined as a fraction having a T10 distillation point of 140° C. or more and a T90 distillation point of 370° C. or less. It is noted that the definitions for distillate boiling range fraction is based on boiling point only. Thus, a distillate boiling range fraction can include components that did not pass through a distillation tower or other separation stage based on boiling point.

References to a periodic table, such as references to the Group number of a metal, are defined herein as references to the current version of the IUPAC periodic table.

Feedstock

In various aspects, a feedstock for production of a renewable distillate fuel, such as renewable diesel, can correspond to a feed derived from a biological source. The feedstock can include fatty acids or fatty acid derivatives. Fatty acid derivatives can include, but are not limited to, fatty acid alkyl esters, such as fatty acid methyl esters (FAME); mono-, di-, and triglycerides; and other fatty acid derivatives that includes carbon chain length of 10 atoms to 20 atoms. Optionally but preferably, the fatty acids and/or fatty acid derivatives can correspond to unsaturated fatty acids and/or fatty acid derivatives, so that the fatty acids and/or fatty acid derivatives in a feedstock include an average olefin content of 0.5 olefins or more per combined fatty acid and fatty acid derivative compound in the feedstock, or 1.0 olefins or more, or 1.4 olefins or more, such as up to 6.0 olefins per combined fatty acid and fatty acid derivative compound in the feedstock, or possibly still higher. Additionally or alternately, the feedstock can include an average olefin content of 0.5 olefins or more per fatty acid carbon chain in the feedstock, or 1.0 olefins or more, or 1.4 olefins or more, such as up to 3.0 olefins or more per fatty acid carbon chain in the feedstock. In this discussion, a fatty acid carbon chain is defined as a carbon chain having 10-22 carbon atoms that is terminated at one end by either a carboxylic acid group or an ester linkage to another carbon chain (such as the propyl backbone of a triglyceride). A compound can include multiple fatty acid carbon chains. For example, a triglyceride contains three fatty acid carbon chains.

In this discussion, a feed derived from a biological source refers to a feedstock derived from a biological raw material component, such as vegetable fats/oils or animal fats/oils, fish oils, pyrolysis oils, and algae lipds/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Vegetable fats/oils, animal fats/oils, fish oils, pyrolysis oils, and/or algae lipds/oils as referred to herein can also include processed material. Non-limiting examples of processed vegetable, animal (including fish), and algae material include fatty acids and fatty acid alkyl esters. Alkyl esters typically include $C_1$-$C_5$ alkyl esters of fatty acids. One or more of methyl, ethyl, and propyl esters are preferred.

Other biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 10 to 22 carbons or 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure corresponding to a reaction product of glycerol and three fatty acids. Although a triglyceride is described herein as having side chains corresponding to fatty acids, it should be understood that the fatty acid component does not necessarily contain a carboxylic acid hydrogen. Other types of feed that are derived from biological raw material components can include fatty acid esters, such as fatty acid alkyl esters (e.g., FAME and/or FAEE).

In some aspects, the feedstock can include 10 wt % or more of triglycerides, or 25 wt % or more, or 40 wt % or more, or 60 wt % or more, such as up to being substantially composed of triglycerides (i.e., up to 100 wt %, or including less than 1.0 wt % of other compounds). In some aspects, the feedstock can include 10 wt % or more of fatty acid alkyl esters, or 25 wt % or more, or 40 wt % or more, or 60 wt % or more, such as up to being substantially composed of fatty acid alkyl esters (i.e., up to 100 wt %, or including less than 1.0 wt % of other compounds). In some aspects, the feedstock can include a combined weight of triglycerides and fatty acid alkyl esters of 10 wt % or more, or 25 wt % or more, or 40 wt % or more, or 60 wt % or more, such as up to being substantially composed of fatty acid alkyl esters and triglycerides (i.e., up to 100 wt %, or including less than 1.0 wt % of other compounds).

A feed derived from a biological source can have a wide range of nitrogen and/or sulfur contents. For example, a feedstock based on a vegetable oil source can contain up to 300 wppm nitrogen. In contrast, a biomass based feedstream containing whole or ruptured algae can sometimes include a higher nitrogen content. Depending on the type of algae, the nitrogen content of an algae based feedstream can be at least 2 wt %, for example at least 3 wt %, at least 5 wt %, such as up to 10 wt % or possibly still higher. The sulfur content of a feed derived from a biological source can also vary. In some embodiments, the sulfur content can be 500 wppm or less, for example 100 wppm or less, or 50 wppm or less, such as down to being substantially free of sulfur (1.0 wppm or less).

Aside from nitrogen and sulfur, oxygen can be another heteroatom component in feeds derived from a biological source. For example, a feed derived from a biological source, prior to hydrotreatment, can include 1.0 wt % to 15 wt % of oxygen, or 1.0 wt % to 10 wt %, or 3.0 wt % to 15 wt %, or 3.0 wt % to 10 wt %, or 4.0 wt % to 15 wt %, or 4.0 wt % to 12 wt %.

In some aspects, a portion of a mineral feedstock can be co-processed with a feed derived from a biological source. A mineral feedstock refers to a conventional feedstock, typically derived from crude oil and that has optionally been subjected to one or more separation and/or other refining processes. In one preferred embodiment, the mineral feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof. The amount of mineral feedstock blended with a feed derived from a biological source can correspond to 1.0 wt % to 20 wt % of the weight of the blended feedstock.

Mineral feedstocks for blending with a feedstock containing fatty acids and/or fatty acid derivatives can be relatively free of nitrogen (such as a previously hydrotreated feedstock) or can have a nitrogen content from about 1 wppm to about 2000 wppm nitrogen, for example from about 50 wppm to about 1500 wppm or from about 75 to about 1000 wppm. In some embodiments, the mineral feedstock can have a sulfur content from about 1 wppm to about 10,000 wppm sulfur, for example from about 10 wppm to about 5,000 wppm or from about 100 wppm to about 2,500 wppm.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Conditions for Deoxygenation and Olefin Saturation

In various aspects, a feedstock including triglycerides, fatty acid alkyl esters, and/or other fatty acid derivatives can be exposed to a series of hydroprocessing stages to form renewable distillate fuel. A first hydroprocessing stage can correspond to one or more beds of hydrotreating catalyst. A second hydroprocessing stage can be an optional stage that includes one or more beds of dewaxing catalyst.

During hydrotreatment, the feedstock can be exposed to one or more beds of hydrotreating catalyst in the presence of $H_2$ and 1.0 vol % or more of CO. In some aspects, at least a portion of the first catalyst bed can contain a hydrotreating catalyst corresponding to Mo or W on a support. Optionally, such a catalyst can be a catalyst that does not include a Group 8-10 metal (such as Ni or Co) as a promoter metal. More generally, in such aspects the catalyst can preferably be a catalyst that includes a Group 6 metal that includes 1.0 wt % or less of a Group 8-10 metal, such as down to having substantially no Group 8-10 metal content. In other aspects, a catalyst including both a Group 8-10 metal and a Group 6 metal can be used. In such aspects, a conventional hydrotreating catalyst can be used. The support for the catalyst can be any convenient type of support, such as alumina, silica, zirconia, titania, amorphous carbon, or combinations thereof. Optionally, a spent hydrotreating catalyst, such as a catalyst having reduced activity after extended service, can be used in at least a portion of the first catalyst bed. Optionally, at least a portion of a hydrotreating catalyst in at least one catalyst bed can correspond to a bulk and/or unsupported hydrotreating catalyst. The first catalyst bed refers to the first catalyst bed that feedstock is exposed to during hydrotreatment.

For later catalyst beds, or optionally for a downstream portion of the first catalyst bed, any convenient type of hydrotreating catalyst can be used. Due to the rapid nature of olefin saturation and deoxygenation, even when CO is present to reduce olefin saturation activity, the olefin saturation and deoxygenation reactions can typically be mostly completed or substantially completed by the end of the first several catalyst beds. Thus, any subsequent downstream catalyst beds can include hydrotreating catalyst that is selected in order to achieve other hydrotreating functions, such as nitrogen removal from the feedstock.

The CO can be present in the treat gas, for example, based on recycling a portion of the gas phase effluent from a hydrotreating stage. Recycling a portion of this gas phase effluent to the hydrodeoxygenation reactor can allow for a buildup of CO in the reactor to a desired level for reducing the olefin saturation activity of the hydrotreating catalyst(s) in the reactor. The amount of CO in the recycled portion of the treat gas can be controlled by adjusting the amount of gas phase effluent that is returned to the reactor as a recycled gas. This can be achieved by, for example, only recycling a portion of the effluent, or by having a bleed stream that is removed from the recycled effluent (or recycled portion of the effluent), or by any other convenient method. Additionally or alternately, a separate CO source can be used to provide a desired amount of CO for the hydrogen treat gas, if the amount of CO in the recycled effluent (or recycled portion of the effluent) is insufficient.

In various aspects, the amount of CO present in the reaction environment can be 1.0 vol % to 8.0 vol %, or 1.4 vol % to 8.0 vol %, or 1.8 vol % to 8.0 vol %, or 1.0 vol % to 6.0 vol %, or 1.4 vol % to 6.0 vol %, or 1.8 vol % to 6.0 vol %. At equilibrium, the amount of CO in the total treat gas introduced into the reactor can be similar to the amount of CO present in the reaction environment in the reactor. It is noted that the amount of CO present in the reaction environment may be lower at the beginning of operation for a reactor. In aspects where at least a portion of the CO is provided based on deoxygenation of feedstock, some initial processing time may be required to reach the equilibrium level of CO based on the feed being processed, the amount of effluent being recycled, and/or the amount of recycled effluent that is removed as a bleed or side stream prior to introduction into the reactor. It is noted that hydrotreating catalysts can tend to deactivate over time when exposed to hydrotreating conditions. As deactivation occurs, it may be possible and/or desirable to reduce the CO concentration that is added to the reactor while maintaining a target level of heat release in the first catalyst bed and/or the initial portion of the first catalyst bed.

The at least one Group 6 metal, in oxide form, can typically be present in an amount ranging from 2.0 wt % to 40 wt %, relative to a total weight of the catalyst, or 6.0 wt % to 40 wt %, or 10 wt % to 30 wt %. When a Group 8-10 metal is also present, the at least one Group 8-10 metal, in oxide form, can typically be present in an amount ranging from 2.0 wt % to 40 wt %, preferably for supported catalysts from 2.0 wt % to 20 wt % or from 4.0 wt % to 15 wt %.

The hydroprocessing catalyst can be provided in a reactor in one or more catalyst beds. For example, a convenient bed length in some reactors is a bed length of about 25 feet to feet. Such a bed length reduces difficulties in a catalyst bed associated with poor flow patterns. Due to the heat release from the initial bed during olefin saturation and deoxygenation, it may be desirable to use a shorter catalyst bed as the initial bed, such as having a bed length of feet to 25 feet.

Typical effective conditions for processing a feedstock containing triglycerides, fatty acid alkyl esters, fatty acids, and/or fatty acid derivatives to remove oxygen and saturate olefins can include a hydrogen partial pressure of 200 psig (1.4 MPag) to 1200 psig (8.3 MPag). Lower hydrogen partial pressures are also beneficial for reducing or minimizing the amount of olefin saturation, including the amount of saturation from propylene to propane that occurs during deoxygenation.

The hydrotreating conditions can also include a temperature, a hydrogen treat gas rate, and a liquid hourly space velocity (LHSV). Suitable effective temperatures can be from 230° C. to 375° C., or 250° C. to 350° C. The LHSV can be from 0.1 $hr^{-1}$ to 10 $hr^{-1}$, or from 0.2 $hr^{-1}$ to 5.0 $hr^{-1}$. The hydrogen treat gas rate can be any convenient value that provides sufficient hydrogen for deoxygenation of a feedstock. Typical values can range from 500 scf/B (84 $Nm^3/m^3$) to 10,000 scf/B (1685 $Nm^3/m^3$). One option for selecting a treat gas rate can be to select a rate based on the expected stoichiometric amount of hydrogen for complete deoxygenation and olefin saturation of the feedstock. For example, many types of feeds derived from biological sources have a stoichiometric hydrogen need for deoxygenation of between 200 scf/B (34 $Nm^3/m^3$) to 5000 scf/B (~850 $Nm^3/m^3$). In some aspects, the hydrogen treat gas rate can be selected based on a multiple of the stoichiometric hydrogen need, such as at least 1 times the hydrogen need, or at least 1.5 times the hydrogen need, or at least 2 times the hydrogen need, such as up to 10 times the hydrogen need or possibly still higher. In other aspects where at least a portion of the gas phase deoxygenation effluent is recycled, any convenient amount of hydrogen relative to the stoichiometric need can be used.

With regard to the hydrogen-containing treat gas, the hydrogen-containing treat gas can be composed of a recycled portion and a make-up portion. The make-up portion of hydrogen-containing treat gas can correspond to a fresh source of hydrogen-containing gas, a hydrogen-containing gas stream from a recycle loop not associated with the deoxygenation reaction system, or another convenient source. The recycled portion of the hydrogen-containing treat gas can be formed based on the effluent from the reaction system and/or the effluent withdrawn at an intermediate location between reaction stages.

For $CO_2$ removal, the gas phase effluent can be treated in any convenient manner, such as passing the gas phase effluent through an amine scrubber system. Such a system may also be suitable for removal of $H_2S$. If desired, water can be removed from the gas phase effluent before, during, or after $CO_2$ removal. Optionally, additional separation steps can be used to further control the CO concentration in the gas phase effluent relative to the $H_2$ content. For example, a membrane separation or a pressure swing adsorption separation can be performed to reduce the CO content of the gas phase effluent. The result of the various separation steps can be a hydrogen-containing stream that also contains CO. In some aspects, in order to allow the CO concentration in the reactor to reach a steady state, a bleed or side stream can be removed from the gas phase effluent at any convenient location (either before or after any of the above separation steps). Due to the difficulty in removing CO without resorting to a membrane separation and/or a pressure swing adsorption type apparatus, use of a bleed stream provides a method for removing a portion of the CO in the gas phase effluent. After the above separation steps and the removal of the bleed stream, a make-up stream of a hydrogen-containing gas can be added to the gas phase effluent to achieve the desired volume flow of gas for input to the reaction system.

An additional consideration during deoxygenation is maintaining the sulfided state of the catalyst. For some types of catalyst, if little or no sulfur is present in the reaction environment, the sulfided metal on the catalyst may have a tendency to be reduced and/or converted to oxide form, leading to reduced deoxygenation activity for the catalyst. In such aspects, to maintain catalyst activity, some sulfur can be introduced into the reaction environment. The sulfur can be introduced as sulfur in a mineral feed that is blended with the triglyceride-containing biocomponent feed. Additionally or alternately, sulfur can be introduced as part of the gas phase environment, such as by using an $H_2$ source that contains some $H_2S$. Still another option can include introducing sulfur as an additive compound, such as by adding dimethyl disulfide (DMDS) to one of the streams entering the reaction environment. Yet another option can be to introduce additional sulfur as part of a sour gas or sour water stream that is passed into the reaction environment. The amount of sulfur present in the reaction environment can be at least 100 wppm, or at least 200 wppm or at least 500 wppm, such as up to 5000 wppm or possibly still higher. If this sulfur is introduced as a gas phase component (such as $H_2S$), the sulfur can be easily removed from any liquid products using a gas-liquid separation. If the sulfur is introduced as part of the feed, it may be feasible to blend the resulting products to achieve an acceptable sulfur level in any final product. Alternatively, subsequent hydroprocessing can be used to reduce the sulfur level of the products, if olefin preservation is not desired.

The hydrotreating conditions for can be suitable for reducing the oxygen content of the feed to 1.0 wt % or less, or 0.5 wt % or less, such as down to having substantially no oxygen (0.1 wt % or less). Although the stoichiometric hydrogen need is calculated based on complete deoxygenation, reducing the oxygen content to substantially zero is typically not required to allow further processing of the deoxygenated feed in conventional equipment. Additionally or alternately, the hydrotreating conditions can be suitable for reducing the olefin content of the feed to 1.0 wt % or less, or 0.5 wt % or less, such as down to having substantially no olefins (0.1 wt % or less).

Catalytic Dewaxing

In some aspects, the hydrotreated effluent (or at least a portion thereof) can then be catalytically dewaxed in order to improve the cold flow properties of the distillate boiling range portion of the effluent. Fatty acid carbon chains often correspond to unbranched carbon chains. After deoxygenation, such unbranched carbon chains can often have relatively poor cold flow properties, such as relatively high pour points, cloud points, or cold filter plugging points. In applications where it is desired to use the distillate boiling range portion of the effluent as part of a diesel fuel, it can be desirable to expose a distillate boiling range product to a dewaxing catalyst under dewaxing conditions in order to improve the cold flow properties.

Dewaxing catalysts can include molecular sieves such as crystalline aluminosilicates (zeolites). More generally, dewaxing catalysts can correspond to catalysts having a zeotype framework. The dewaxing catalyst can optionally be a supported catalyst, such as a catalyst including a zeotype framework and a binder material. In an embodiment, the zeotype framework can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, zeotype frameworks that are selective for dewaxing by isomerization as opposed to cracking can be used, such as ZSM-48, zeolite Beta, ZSM-23, or a combination thereof. Additionally or alternately, the zeotype framework can comprise, consist essentially of, or be a 10-member ring 1-D zeotype framework. Optionally but preferably, the dewaxing catalyst can include a binder for the zeotype framework, such as alumina, titania, silica, silica-alumina, zirconia, or a combination thereof, for example alumina and/or titania or silica and/or zirconia and/or titania.

Aside from the zeotype framework(s) and optional binder, the dewaxing catalyst can also include at least one metal hydrogenation component, such as a Group 8-10 metal. Suitable Group 8-10 metals can include, but are not limited to, Pt, Pd, Ni, or a combination thereof. When a metal hydrogenation component is present, the dewaxing catalyst can include 0.1 wt % to 10 wt % of the Group 8-10 metal, or 0.1 wt % to 5.0 wt %, or 0.5 wt % to 10 wt %, or 0.5 wt % to 5.0 wt %, or 1.0 wt % to 10 wt %, or 1.0 wt % to 5.0 wt %.

In some aspects, the dewaxing catalyst can include an additional Group 6 metal hydrogenation component, such as W and/or Mo. In such aspects, when a Group 6 metal is present, the dewaxing catalyst can include 0.5 wt % to 20 wt % of the Group 6 metal, or 0.5 wt % to 10 wt %, or 2.5 wt % to 20 wt %, or 2.5 wt % to 10 wt %. As one example, the dewaxing catalyst can include 0.1 wt % to 5.0 wt % Pt and/or Pd as the hydrogenation metal component. As another example, the dewaxing catalyst can include as the hydrogenation metal components Ni and W, Ni and Mo, or Ni and a combination of W and Mo.

Catalytic dewaxing can be performed by exposing a feedstock to a dewaxing catalyst under effective (catalytic) dewaxing conditions. Dewaxing conditions can include temperatures of 550° F. (288° C.) to 840° F. (449° C.), hydrogen partial pressures of from 250 psig to 5000 psig (1.8 MPag to 34.6 MPag), and hydrogen treat gas rates of from 34 Nm³/m³ to 1700 sm³/m³ (~200 SCF/B to ~10,000 SCF/B). The liquid hourly space velocity (LHSV) of the feed relative to the dewaxing catalyst can be characterized can be from about 0.1 hr$^{-1}$ to about 10 hr$^{-1}$.

Configuration Example

Figure 1:
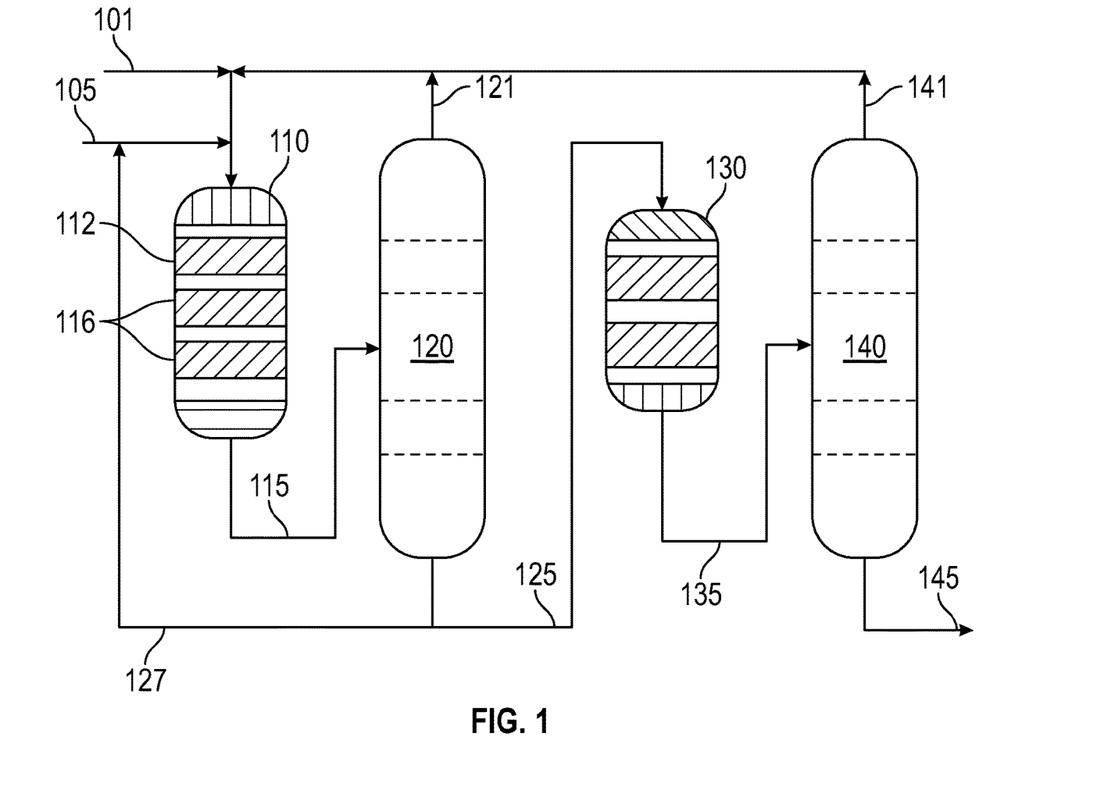
FIG. 1 shows an example of a reaction system for production of renewable distillate fuel.

FIG. 1 shows an example of a reaction system for forming distillate fuels from a feed derived from a biological source that contains glycerides, fatty acids, and/or fatty acid derivatives. In FIG. 1, a feedstock 105 and fresh (or make-up) hydrogen 101 are passed into a hydrotreatment stage 110. The hydrotreatment stage 110 is shown as a reactor with multiple catalyst beds, but other convenient configurations for a hydrotreatment stage could be used. The catalyst beds include a first catalyst bed 112 and one or more additional catalyst beds 116. Exposing the feedstock 105 to the catalyst in first catalyst bed 112 and one or more additional catalyst beds 116 results in a hydrotreated effluent 115. Hydrotreated effluent 115 can then be passed into a separation stage 120, such as a fractionation tower or a gas-liquid separator. The separation stage 120 can form at least a heavy fraction 125, such as a $C_{5+}$ fraction, and a light ends or gas fraction 121. Optionally, a portion of heavy fraction 125 can be used as a recycle stream 127 that is combined with feedstock 105.

The heavy fraction 125 can then be passed into a dewaxing stage 130 that includes one or more beds of dewaxing catalyst to form a dewaxed effluent 135. Optionally, additional make-up hydrogen can be added to dewaxing stage 130 (not shown). The dewaxed effluent 135 can be passed into a second separation stage 140 to form at least a renewable distillate product 145 and a light ends or gas fraction 141. Optionally, light ends fraction 121 and/or light ends fraction 141 can be recycled for use as part of the hydrogen passed into reactor 110. The light ends fraction 121 and/or light ends fraction 141 can undergo one or more separations (not shown) to increase the concentration of hydrogen prior to introduction into reactor 110.

Example 1—Selective Reduction of Olefin Saturation Activity

A fixed-bed isothermal hydrotreating pilot unit was used to determine the impact of CO on catalyst activity for deoxygenation and olefin saturation. The reactor was operated under the following conditions: a temperature of 315° C., a total pressure of 5.5 MPa-g, a LHSV (liquid hourly space velocity) of 4.0 hr$^{-1}$, and a treat gas to oil ratio of roughly 4000 SCF/B (~680 Nm³/m³). The reactor was loaded with a hydrotreating catalyst corresponding to Mo on a refractory support. The feed was equal parts (by volume) of canola oil and n-$C_{18}$. This resulted in a feed with an initial oxygen content (in the liquid feed) of 6.15 wt %. In the first condition, the treat gas was 100 vol % hydrogen. In the second condition, the treat gas was 4 mol % CO and 96 mol % hydrogen, which is substantially the same as 4.0 vol % CO and 96 vol % hydrogen. The conditions were selected to provide a relatively low level of olefin saturation and deoxygenation, so that it would be feasible to determine rate constants.

The oxygen and olefin content of the feed and product were measured and used to calculate the first-order rate constants shown in Table 1. In Table 1, "k Oxy" refers to the first order rate constant for deoxygenation, while "k Olef" refers to the first order rate constant for olefin saturation.

TABLE 1

Selective Reduction of Rate Constants

| Rate Constant (1/hr) | No CO | 4 vol % CO | Change (%) |
|---|---|---|---|
| Oxygen Removal (k Oxy) | 0.53 | 0.45 | −15 |
| Olefin Sat (k Olef) | 0.75 | 0.38 | −49 |
| k Olef/k Oxy | 1.41 | 0.84 | −40 |
| Propane/Propene ratio | 0.26 | 0.25 | −5 |
| Oxygen in Total Liquid Product | 5.39 wt % | 5.50 wt % | |
| Oxygen Conversion | 12.4 wt % | 10.6 wt % | |

When no CO is present in the treat gas, the rate of olefin saturation is faster than oxygen removal. However, when 4 vol % CO was added to the treat gas, only a small reduction in k Oxy was observed while k Olef was reduced by ~50%. Due to the selective CO inhibition, the rate constant for olefin saturation was unexpectedly lower than the rate constant for oxygen removal. More generally, it was unexpectedly discovered that addition of 1.0 vol % or more (or 1.4 vol % or more) of CO to the reaction environment provided a substantial reduction in the reaction rate for olefin saturation while causing only a modest reduction in the reaction rate for deoxygenation.

It is noted that the addition of CO did not impact the relative amounts of propane and propene that were formed under the deoxygenation conditions. During hydroprocessing of triglycerides, the propyl backbone that binds the three fatty acid chains of the triglyceride together is typically separated from the fatty acid chains. A portion of the propyl backbones form propane, while another portion form propene. As shown in Table 2, similar amounts of propane and propene were formed independent of whether CO was added to the reaction environment. It is noted that the conditions used to generate the data in Table 2 resulted in removal of less than 15 wt % of the oxygen present in the feed, which may account for the relatively low ratio of propane to propene in the reaction products.

The rate constants from Table 1 were then used in an empirical model to determine the impact of CO addition on catalyst bed size and recycle rate. For the comparison, a baseline configuration was used of processing a feed corresponding to 50 vol % soybean oil and 50 vol % recycled product with no CO addition. The catalyst volume in the baseline configuration was selected to be sufficient to perform complete deoxygenation of the feed. This baseline configuration was then compared with a configuration where 2.0 vol % CO was included in the reaction environment. Using the kinetic model, the amount of change in the recycle rate while maintaining the same temperature profile was determined. The amount of change in the required catalyst bed volume for complete deoxygenation was also determined. The results from the kinetic modeling are shown in Table 2. The unit "kbd" refers to kilo barrels per day.

TABLE 2

Kinetic Modeling of Lower Recycle with CO Addition

|  | No CO | 2 vol % CO |
| --- | --- | --- |
| Total Feed (kbd) | 20 | 18 |
| Fresh Feed (kbd) | 10 | 10 |
| Recycle Feed (kbd) | 10 | 8 |
| Catalyst Volume (ft$^3$) | 6410 | 6176 |

As shown in Table 2, addition of 2.0 vol % CO to the reaction environment allowed the recycle rate to be reduced from 50% of the total input flow to the reactor to 44% of the total input flow. Additionally, the catalyst volume required for substantially complete deoxygenation was reduced by roughly 4 vol %. The ability to mitigate heat release in the initial beds during hydroprocessing of a bio-derived feed while also reducing the catalyst volume is an unexpected outcome. Using conventional methods based only on product recycle to manage heat release, the mitigation of heat release is accompanied by a corresponding increase in catalyst volume. By contrast, using CO to selectively reduce the olefin saturation activity can allow substantially complete deoxygenation to be performed at a desired level of temperature increase in an initial catalyst bed with reduced recycle and reduced catalyst volume.

Additional Embodiments

Embodiment 1. A method for processing a feed comprising fatty acids, fatty acid derivatives, or a combination thereof, comprising: exposing a feed comprising 4.0 wt % or more of oxygen and 20 wt % or more of fatty acids, fatty acid derivatives, or a combination thereof to one or more catalyst beds comprising hydrotreating catalyst in a reactor having a reactor diameter of 1.0 m or more under hydrotreating conditions to form a hydrotreated effluent comprising 1.0 wt % or less of oxygen, the exposing of the feed to a first upstream catalyst bed of the one or more catalyst beds under hydrotreating conditions further comprising exposing the feed to the first upstream catalyst bed in the presence of 1.0 vol % or more of CO, or optionally 1.4 vol % or more of CO, the first upstream catalyst bed comprising a catalyst bed depth of 1.0 m or more.

Embodiment 2. The method of Embodiment 1, wherein the one or more catalyst beds comprise 25 m$^3$ or more of hydrotreating catalyst, or wherein the first upstream catalyst bed of the one or more catalyst beds comprises 25 m$^3$ or more of hydrotreating catalyst.

Embodiment 3. The method of any of the above embodiments, wherein the feed comprises 2.0 wt % or more of olefins.

Embodiment 4. The method of any of the above embodiments, a) wherein the fatty acids, fatty acid derivatives, or a combination thereof comprise an average olefin content of 1.0 olefins or more per combined fatty acid and fatty acid derivative compound; b) wherein the fatty acids, fatty acid derivatives, or a combination thereof comprise an average olefin content of 1.0 olefins or more per fatty acid carbon chain; or c) a combination of a) and b).

Embodiment 5. The method of any of the above embodiments, wherein the hydrotreated effluent comprises 1.0 wt % or less of olefins.

Embodiment 6. The method of any of the above embodiments, wherein the feed is exposed to the one or more catalyst beds under hydrotreating conditions in the presence of 1.0 vol % or more of CO.

Embodiment 7. The method of any of the above embodiments, wherein the hydrotreating catalyst comprises a Group 6 metal, or wherein the hydrotreating catalyst comprises a Group 6 metal and less than 1.0 wt % of a Group 8-10 metal, the Group 6 metal optionally comprising Mo.

Embodiment 8. The method of any of the above embodiments, wherein the feed comprises 40 wt % or more of fatty acids, fatty acid derivatives, or a combination thereof.

Embodiment 9. The method of any of the above embodiments, wherein the 20 wt % or more of fatty acids, fatty acid derivatives, or a combination thereof comprise 20 wt % or more of fatty acid methyl esters, fatty acid alkyl esters, triglycerides, or a combination thereof.

Embodiment 10. The method of any of the above embodiments, further comprising exposing at least a portion of the hydrotreated effluent to a dewaxing catalyst under catalytic dewaxing conditions.

Embodiment 11. The method of any of the above embodiments, further comprising exposing at least a portion of the hydrotreated effluent to at least one additional catalyst bed comprising hydrotreating catalyst.

Embodiment 12. The method of any of the above embodiments, wherein the feed comprises a fresh feed fraction and a recycle fraction, the recycle fraction comprising at least a portion of the hydrotreated effluent.

Embodiment 13. The method of Embodiment 12, i) wherein the fresh feed fraction comprises 60 wt % or more of fatty acids, fatty acid derivatives, or a combination thereof, relative to a weight of the fresh feed fraction; ii) wherein the feed comprises 45 wt % or less of the recycle fraction; or iii) a combination of i) and ii).

Embodiment 14. The method of any of the above embodiments, wherein the 1.0 vol % or more of CO comprises CO added to the reactor as part of an $H_2$ recycle stream.

Embodiment 15. The method of any of the above embodiments, wherein a temperature difference across the first upstream catalyst bed is 60° C. or less.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for processing a feed comprising fatty acids, fatty acid derivatives, or a combination thereof, comprising:
   exposing a feed comprising 20 wt % or more of fatty acids, fatty acid derivatives, or a combination thereof to one or more catalyst beds comprising hydrotreating catalyst in a reactor having a reactor diameter of 1.0 m or more under hydrotreating conditions to form a hydrotreated effluent comprising 1.0 wt % or less of oxygen, wherein the feed is exposed to a first upstream catalyst bed of the one or more catalyst beds under hydrotreating conditions in the presence of 1.4 vol % or more of CO, the first upstream catalyst bed comprising a catalyst bed depth of 1.0 m or more, the feed comprising 4.0 wt % or more of oxygen relative to a weight of the feed.

2. The method of claim 1, wherein the one or more catalyst beds comprise 25 $m^3$ or more of hydrotreating catalyst, or wherein the first upstream catalyst bed of the one or more catalyst beds comprises 25 $m^3$ or more of hydrotreating catalyst.

3. The method of claim 1, wherein the feed comprises 2.0 wt % or more of olefins.

4. The method of claim 1, wherein the fatty acids, fatty acid derivatives, or a combination thereof comprise an average olefin content of 1.0 olefins or more per combined fatty acid and fatty acid derivative compound.

5. The method of claim 1, wherein the fatty acids, fatty acid derivatives, or a combination thereof comprise an average olefin content of 1.0 olefins or more per fatty acid carbon chain.

6. The method of claim 1, wherein the hydrotreated effluent comprises 1.0 wt % or less of olefins.

7. The method of claim 1, wherein the hydrotreating catalyst comprises a Group 6 metal, or wherein the hydrotreating catalyst comprises a Group 8-10 metal and a Group 6 metal.

8. The method of claim 7, wherein the hydrotreating catalyst comprises a Group 6 metal and comprises less than 1.0 wt % of a Group 8-10 metal, as oxide.

9. The method of claim 7, wherein the Group 6 metal comprises Mo.

10. The method of claim 1, wherein the feed comprises 40 wt % or more of fatty acids, fatty acid derivatives, or a combination thereof.

11. The method of claim 1, wherein the 20 wt % or more of fatty acids, fatty acid derivatives, or a combination thereof comprise 20 wt % or more of fatty acid methyl esters, fatty acid alkyl esters, triglycerides, or a combination thereof.

12. The method of claim 1, further comprising exposing at least a portion of the hydrotreated effluent to a dewaxing catalyst under catalytic dewaxing conditions.

13. The method of claim 1, further comprising exposing at least a portion of the hydrotreated effluent to at least one additional catalyst bed comprising hydrotreating catalyst.

14. The method of claim 1, wherein the feed comprises a fresh feed fraction and a recycle fraction, the recycle fraction comprising at least a portion of the hydrotreated effluent.

15. The method of claim 14, wherein the fresh feed fraction comprises 60 wt % or more of fatty acids, fatty acid derivatives, or a combination thereof, relative to a weight of the fresh feed fraction.

16. The method of claim 14, wherein the feed comprises 45 wt% or less of the recycle fraction.

17. The method of claim 1, wherein the 1.4 vol % or more of CO comprises CO added to the reactor as part of an H2 recycle stream.

18. The method of claim 1, wherein a temperature difference across the first upstream catalyst bed is 60° C. or less.

19. A method for processing a feed comprising fatty acids, fatty acid derivatives, or a combination thereof, comprising:
   exposing a feed comprising 20 wt % or more of fatty acids, fatty acid derivatives, or a combination thereof to one or more catalyst beds comprising hydrotreating catalyst in a reactor having a reactor diameter of 1.0 m or more under hydrotreating conditions to form a hydrotreated effluent comprising 1.0 wt % or less of oxygen, the hydrotreating catalyst comprising a Group 6 metal and less than 1.0 wt % of a Group 8-10 metal as oxide, wherein the feed is exposed to a first upstream catalyst bed of the one or more catalyst beds under hydrotreating conditions in the presence of 1.0 vol % or more of CO, the first upstream catalyst bed comprising a catalyst bed depth of 1.0 m or more, the feed comprising 4.0 wt % or more of oxygen relative to a weight of the feed.

20. The method of claim 19, wherein the feed is exposed to the first upstream catalyst bed under hydrotreating conditions in the presence of 1.4 vol % or more of CO.

* * * * *